US011221954B2

(12) United States Patent
Gupta et al.

(10) Patent No.: US 11,221,954 B2
(45) Date of Patent: Jan. 11, 2022

(54) STORING METADATA IN HETEROGENEOUS CACHE TO IMPROVE I/O PERFORMANCE

(71) Applicant: International Business Machines Corporation, Armonk, NY (US)

(72) Inventors: Lokesh M. Gupta, Tucson, AZ (US); Kyler A. Anderson, Sahuarita, AZ (US); Kevin J. Ash, Tucson, AZ (US); Matthew G. Borlick, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 115 days.

(21) Appl. No.: 16/687,222

(22) Filed: Nov. 18, 2019

(65) Prior Publication Data

US 2021/0149807 A1    May 20, 2021

(51) Int. Cl.
| | |
|---|---|
| *G06F 12/08* | (2016.01) |
| *G06F 3/06* | (2006.01) |
| *G06F 12/0866* | (2016.01) |
| *G06F 12/0811* | (2016.01) |

(52) U.S. Cl.
CPC .......... *G06F 12/0866* (2013.01); *G06F 3/061* (2013.01); *G06F 3/0614* (2013.01); *G06F 3/0653* (2013.01); *G06F 3/0679* (2013.01); *G06F 12/0811* (2013.01); *G06F 2212/466* (2013.01); *G06F 2212/7209* (2013.01)

(58) Field of Classification Search
CPC .... G06F 12/0866; G06F 3/061; G06F 3/0614; G06F 3/0653; G06F 3/0679; G06F 12/0811; G06F 2212/466
See application file for complete search history.

(56) References Cited

U.S. PATENT DOCUMENTS

| | | | | |
|---|---|---|---|---|
| 9,696,934 | B2* | 7/2017 | Rothberg | .............. G06F 3/0679 |
| 10,133,663 | B2* | 11/2018 | Atkisson | ............. G06F 12/0246 |
| 10,664,177 | B2* | 5/2020 | Benhase | ................. G06F 12/12 |

(Continued)

OTHER PUBLICATIONS

Y. Wang, B. Veeravalli and C. Tham, "On Data Staging Algorithms for Shared Data Accesses in Clouds," in IEEE Transactions on Parallel and Distributed Systems, vol. 24, No. 4, pp. 825-838, Apr. 2013.*

(Continued)

*Primary Examiner* — Pierre Miche Bataille
(74) *Attorney, Agent, or Firm* — Nelson IP; Daniel P. Nelson

(57) ABSTRACT

A method for storing metadata in a cache comprising heterogeneous memory types is disclosed. The method stages data elements containing metadata into a lower performance portion of a cache. The cache includes the lower performance portion and a higher performance portion. In response to determining that the data elements are updated in the higher performance portion, the method records when the data elements were updated and invalidates the data elements in the lower performance portion. The method scans the lower performance portion for the data elements that are invalidated and re-stages, in the lower performance portion, the data elements that are invalidated and have not been updated in the higher performance portion in a last specified period of time. A corresponding system and computer program product are also disclosed.

20 Claims, 8 Drawing Sheets

(56) References Cited

U.S. PATENT DOCUMENTS

| | | |
|---|---|---|
| 10,866,898 B2 * | 12/2020 | Lee ................ G06F 12/0246 |
| 11,061,828 B1 * | 7/2021 | Peterson ............ G06F 12/0246 |
| 2014/0115235 A1 | 4/2014 | Ito et al. |
| 2016/0041770 A1 | 2/2016 | Fang et al. |
| 2018/0067660 A1 | 3/2018 | Yamamoto |
| 2019/0065121 A1 | 2/2019 | Malina et al. |
| 2020/0133836 A1 * | 4/2020 | Mizushima ......... G06F 12/0873 |

OTHER PUBLICATIONS

L. Cheng and J. B. Carter, "Extending CC-NUMA systems to support write update optimizations," SC '08: Proceedings of the 2008 ACM/IEEE Conference on Supercomputing, 2008, pp. 1-12.*

* cited by examiner

STORING METADATA IN HETEROGENEOUS CACHE TO IMPROVE I/O PERFORMANCE

BACKGROUND

Field of the Invention

This invention relates to systems and methods for storing metadata in cache made up of heterogeneous memory types in order to improve I/O performance.

Background of the Invention

In the field of computing, a "cache" typically refers to a small, fast memory or storage device used to store data or instructions that were accessed recently, are accessed frequently, or are likely to be accessed in the future. Reading from or writing to a cache is typically cheaper (in terms of access time and/or resource utilization) than accessing other memory or storage devices. Once data is stored in cache, it can be accessed in cache instead of re-fetching and/or re-computing the data, saving both time and resources.

SUMMARY

The invention has been developed in response to the present state of the art and, in particular, in response to the problems and needs in the art that have not yet been fully solved by currently available systems and methods. Accordingly, systems and methods have been developed to store metadata in a cache comprising heterogeneous memory types. The features and advantages of the invention will become more fully apparent from the following description and appended claims, or may be learned by practice of the invention as set forth hereinafter.

Consistent with the foregoing, a method for storing metadata in a cache comprising heterogeneous memory types is disclosed. The method stages data elements containing metadata into a lower performance portion of a cache. The cache includes the lower performance portion and a higher performance portion. In response to determining that the data elements are updated in the higher performance portion, the method records when the data elements were updated and invalidates the data elements in the lower performance portion. The method scans the lower performance portion for the data elements that are invalidated and re-stages, in the lower performance portion, the data elements that are invalidated and have not been updated in the higher performance portion in a last specified period of time.

A corresponding system and computer program product are also disclosed and claimed herein.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the embodiments of the invention will be described and explained with additional specificity and detail through use of the accompanying drawings, in which.

DETAILED DESCRIPTION

Figure 1:
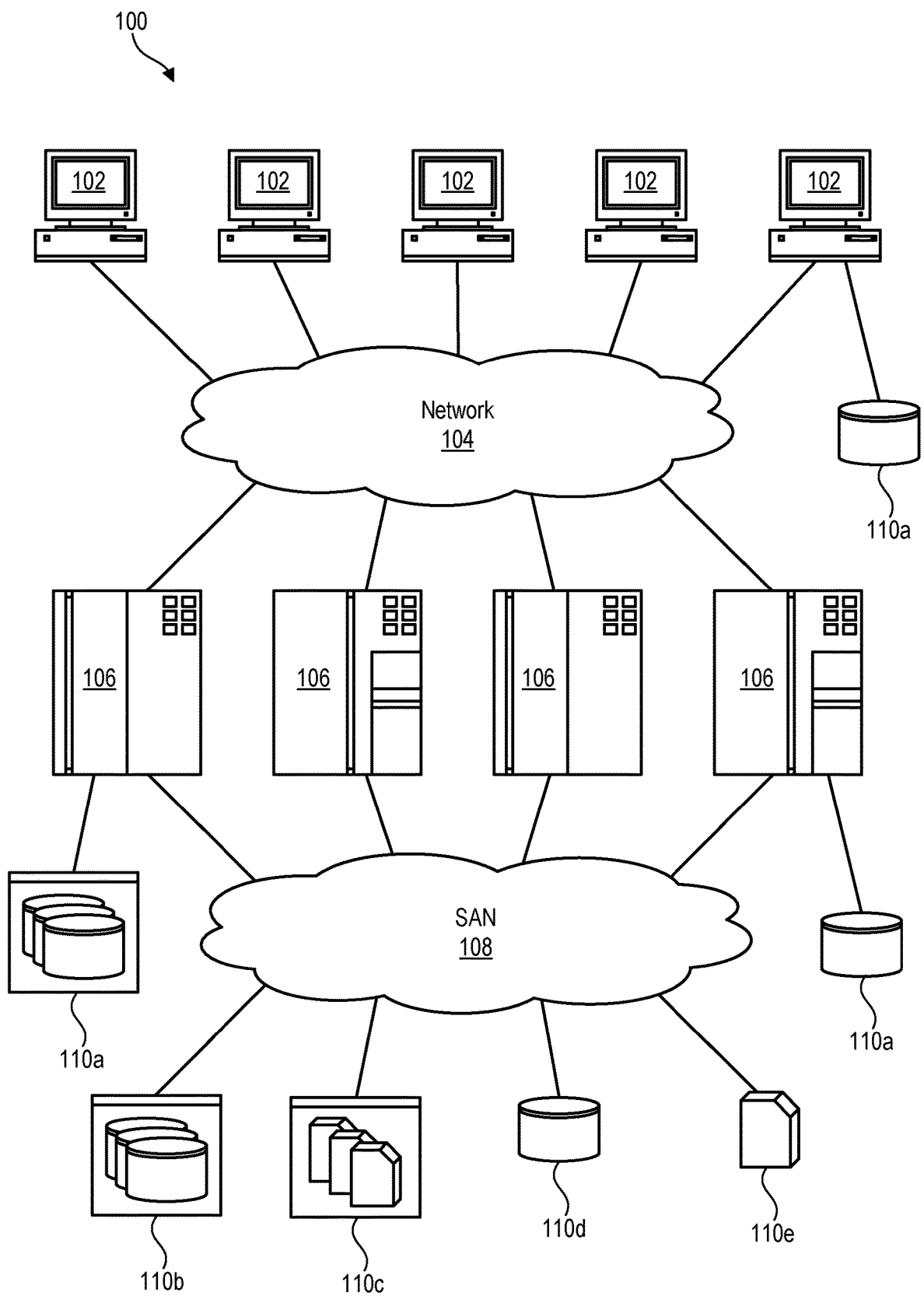
FIG. 1 is a high-level block diagram showing one example of a network environment in which embodiments of the invention may be implemented.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

The present invention may be embodied as a system, method, and/or computer program product. The computer program product may include a computer readable storage medium (or media) having computer readable program instructions thereon for causing a processor to carry out aspects of the present invention.

The computer readable storage medium may be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer readable program instructions may execute entirely on a user's computer, partly on a user's computer, as a stand-alone software package, partly on a user's computer and partly on a remote computer, or entirely on a remote computer or server. In the latter scenario, a remote computer may be connected to a user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, may be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

Referring to FIG. 1, one example of a network environment 100 is illustrated. The network environment 100 is presented to show one example of an environment where systems and methods in accordance with the invention may be implemented. The network environment 100 is presented by way of example and not limitation. Indeed, the systems and methods disclosed herein may be applicable to a wide variety of different network environments, in addition to the network environment 100 shown.

As shown, the network environment 100 includes one or more computers 102, 106 interconnected by a network 104. The network 104 may include, for example, a local-area-network (LAN) 104, a wide-area-network (WAN) 104, the Internet 104, an intranet 104, or the like. In certain embodiments, the computers 102, 106 may include both client computers 102 and server computers 106 (also referred to herein as "host systems" 106). In general, the client computers 102 initiate communication sessions, whereas the server computers 106 wait for requests from the client computers 102. In certain embodiments, the computers 102 and/or servers 106 may connect to one or more internal or external direct-attached storage systems 110a (e.g., arrays of hard-disk drives, solid-state drives, tape drives, etc.). These computers 102, 106 and direct-attached storage systems 110a may communicate using protocols such as ATA, SATA, SCSI, SAS, Fibre Channel, or the like.

The network environment 100 may, in certain embodiments, include a storage network 108 behind the servers 106, such as a storage-area-network (SAN) 108 or a LAN 108 (e.g., when using network-attached storage). This network 108 may connect the servers 106 to one or more storage systems, such as arrays 110b of hard-disk drives or solid-state drives, tape libraries 110c, individual hard-disk drives 110d or solid-state drives 110d, tape drives 110e, CD-ROM libraries, or the like. To access a storage system 110, a host system 106 may communicate over physical connections from one or more ports on the host system 106 to one or more ports on the storage system 110. A connection may be through a switch, fabric, direct connection, or the like. In certain embodiments, the servers 106 and storage systems 110 may communicate using a networking standard such as Fibre Channel (FC).

Figure 2:
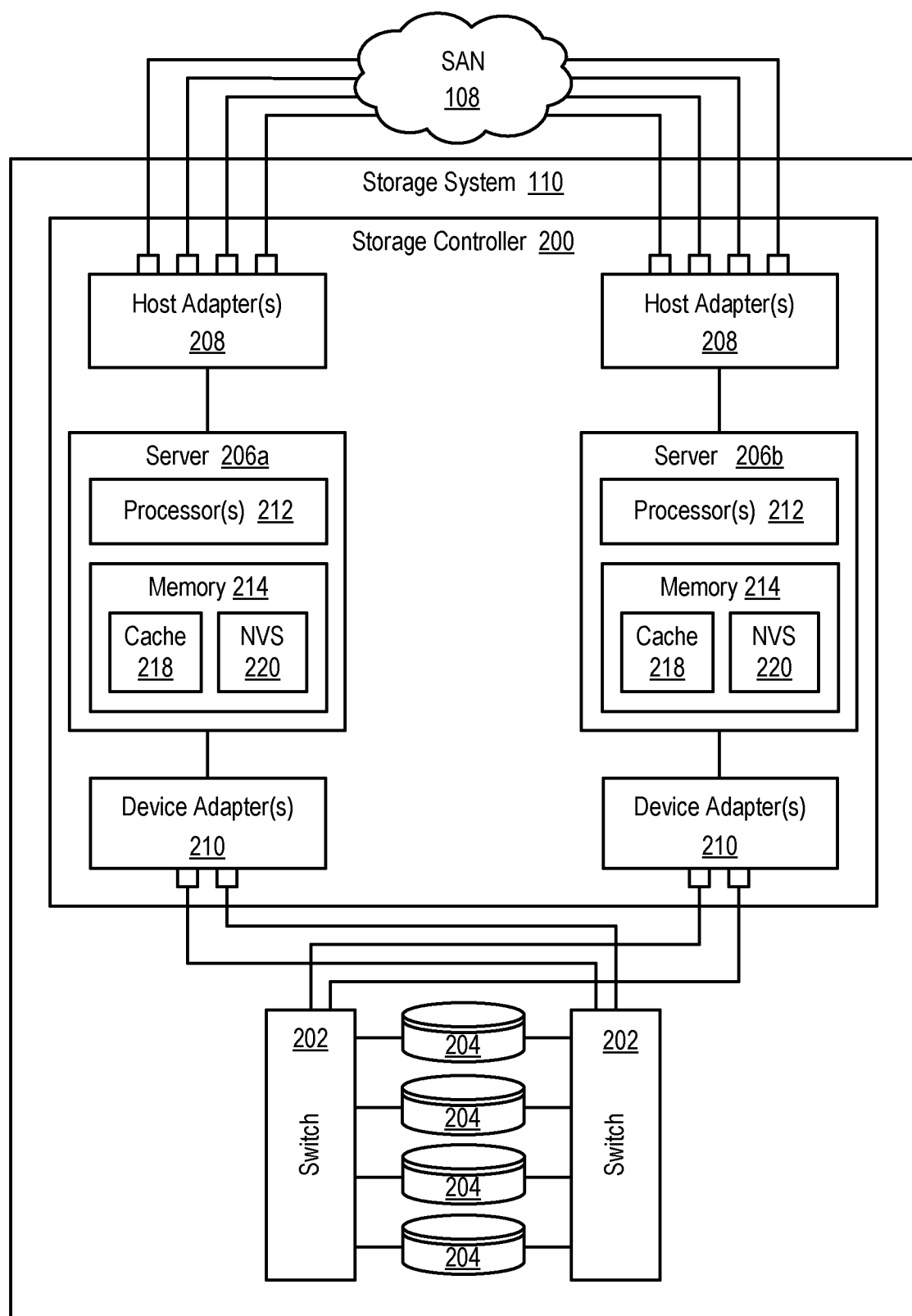
FIG. 2 is a high-level block diagram showing one example of a storage system for use in the network environment of FIG. 1.

Referring to FIG. 2, one embodiment of a storage system 110 containing an array of hard-disk drives 204 and/or solid-state drives 204 is illustrated. As shown, the storage system 110 includes a storage controller 200, one or more switches 202, and one or more storage drives 204, such as hard disk drives 204 or solid-state drives 204 (such as flash-memory-based drives 204). The storage controller 200 may enable one or more host systems 106 (e.g., open system and/or mainframe servers 106 running operating systems such z/OS, zVM, or the like) to access data in the one or more storage drives 204.

In selected embodiments, the storage controller 200 includes one or more servers 206. The storage controller 200 may also include host adapters 208 and device adapters 210 to connect the storage controller 200 to host systems 106 and storage drives 204, respectively. Multiple servers 206a, 206b may provide redundancy to ensure that data is always available to connected host systems 106. Thus, when one server 206a fails, the other server 206b may pick up the I/O load of the failed server 206a to ensure that I/O is able to continue between the host systems 106 and the storage drives 204. This process may be referred to as a "failover."

In selected embodiments, each server 206 includes one or more processors 212 and memory 214. The memory 214 may include volatile memory (e.g., RAM) as well as non-volatile memory (e.g., ROM, EPROM, EEPROM, hard disks, flash memory, etc.). The volatile and non-volatile memory may, in certain embodiments, store software modules that run on the processor(s) 212 and are used to access data in the storage drives 204. These software modules may manage all read and write requests to logical volumes in the storage drives 204.

In selected embodiments, the memory 214 includes a cache 218, such as a DRAM cache 218. Whenever a host system 106 (e.g., an open system or mainframe server 106) performs a read operation, the server 206 that performs the read may fetch data from the storages drives 204 and save it to its cache 218 in the event it is required again. If the data is requested again by a host system 106, the server 206 may fetch the data from the cache 218 instead of fetching it from the storage drives 204, saving both time and resources. Similarly, when a host system 106 performs a write, the server 106 that receives the write request may store the write in its cache 218, and destage the write to the storage drives 204 at a later time. When a write is stored in cache 218, the write may also be stored in non-volatile storage (NVS) 220 of the opposite server 206 so that the write can be recovered by the opposite server 206 in the event the first server 206 fails. In certain embodiments, the NVS 220 is implemented as battery-backed memory in the opposite server 206.

One example of a storage system 110 having an architecture similar to that illustrated in FIG. 2 is the IBM DS8000™ enterprise storage system. The DS8000™ is a high-performance, high-capacity storage controller providing disk storage that is designed to support continuous operations. Nevertheless, the systems and methods disclosed herein are not limited to operation with the IBM DS8000™ enterprise storage system 110, but may operate with any comparable or analogous storage system 110, regardless of the manufacturer, product name, or components or component names associated with the system 110. Furthermore, any storage system that could benefit from one or more embodiments of the invention is deemed to fall within the scope of the invention. Thus, the IBM DS8000™ is presented by way of example and is not intended to be limiting.

Figure 3:
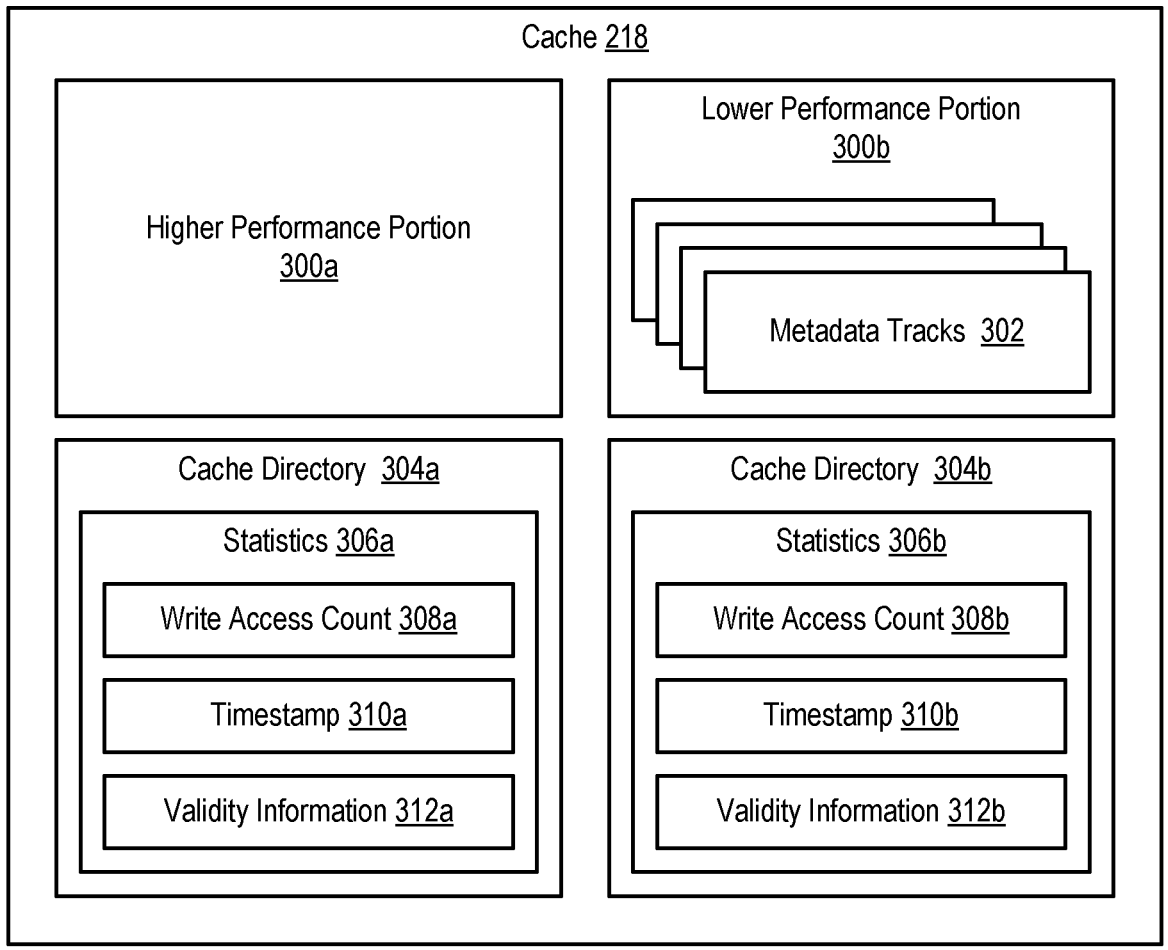
FIG. 3 is a high-level block diagram showing a cache made up of a higher performance portion and a lower performance portion.

Referring to FIG. 3, as previously mentioned, flash memory and other solid-state memory devices can potentially create caches with much larger storage capacities than those using more expensive memory such as DRAM cache. For example, storage class memory (SCM), a type of non-volatile NAND flash memory, provides access speeds that are much higher than solid state drives (SSDs). SCM is much cheaper than DRAM but has higher latency than DRAM (microseconds compared to nanoseconds). Because SCM uses flash memory to store data, SCM exhibits some of the same limitations and deficiencies as flash memory, such as write-cycle limits and issues with data fragmentation. Because of its potential to create caches with much larger storage capacities, systems and methods are needed to effectively incorporate flash memory, such as SCM, into cache. Ideally, such systems and method will take into account the limitations and deficiencies of flash memory, such as write-cycle limits and data fragmentation issues.

FIG. 3 is a high-level block diagram showing a heterogeneous cache 218 (i.e., a cache 218 made up of heterogeneous memory types) comprising a higher performance portion 300a and a lower performance portion 300b. In certain embodiments, the higher performance portion 300a is made up of DRAM memory and the lower performance portion 300b is made up of SCM memory, although other memory types may also be used. The higher performance portion 300a and lower performance portion 300b may be used together to provide a cache 218 within a storage system 110 such as the IBM DS8000™ enterprise storage system. Because memory making up the lower performance portion 300b is likely cheaper than memory making up the higher performance portion 300a, the lower performance portion 300b may have a larger storage capacity, perhaps much larger, than the higher performance portion 300a.

As shown, the higher performance portion 300a may have associated therewith a cache directory 304a. The cache directory 304a may record which data elements (e.g., tracks) are stored in the higher performance portion 300a and where they are stored. For each data element that is stored in the higher performance portion 300a, the cache directory 304a may store various statistics 306a. For example, the statistics 306a may include a write access count 308a for each data element in the higher performance portion 300a. This write access count 308a may be incremented each time the corresponding data element is updated in the higher performance portion 300a. The statistics 306a may also include a timestamp 310a for each data element in the higher performance portion 300a. This timestamp 310a may record the date/time that the corresponding data element was last updated in the higher performance portion 300a. Finally, the statistics 306a may include validity information 312a for each data element that indicates whether a data element in the higher performance portion 300a is valid or invalid. A data element that has been superseded or updated by another more recent version of the data element may be marked invalid, whereas the most recent or current version of the data element may be marked valid.

Similarly, the lower performance portion 300b may also include a cache directory 304b. The cache directory 304b may record which data elements (e.g., tracks) are stored in the lower performance portion 300b and where they are stored. For each data element that is stored in the lower performance portion 300b, the cache directory 304b may store statistics 306b. The statistics 306b may include a write access count 308b for each data element in the lower performance portion 300b that is incremented each time the data element is updated. The statistics 306b may also include a timestamp 310b for each data element that records the date/time that the corresponding data element was last updated in the lower performance portion 300b. Finally, the statistics 306b may include validity information 312b for each data element in the lower performance portion 300b. A data element in the lower performance portion 300b that has been superseded or updated by another more recent version of the data element may be marked invalid, whereas the most recent or current version of the data element may be marked valid.

In certain embodiments, the lower performance portion 300b is used primarily or exclusively to store certain types of data elements, such as data elements 302 containing metadata (e.g., metadata tracks 302). For example, where the lower performance portion 300b is used to store metadata tracks 302, all metadata tracks 302 in backend storage drives 204 may be brought into the lower performance portion 300b, such as at the initial machine load (IML) time of a storage system 110. Each metadata track 302 may store metadata for a certain number of data tracks (e.g., one thousand data tracks). Each time a data track is accessed, the corresponding metadata track 302 may also need to be accessed. Thus, storing the metadata tracks 302 in the heterogeneous cache 218, and more specifically the lower performance portion 300b of the heterogeneous cache 218, may significantly improve I/O performance when accessing the corresponding data tracks.

Figure 4:
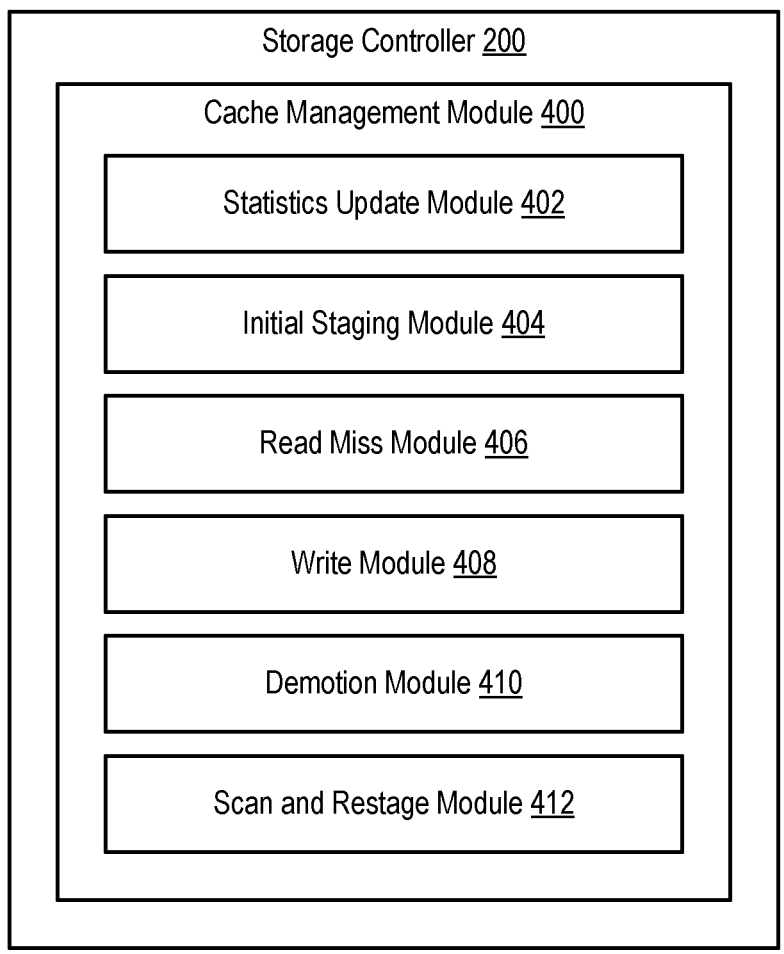
FIG. 4 is a high-level block diagram showing a cache management module in accordance with the invention.

Referring to FIG. 4, in certain embodiments, a cache management module 400 may be used to manage a heterogeneous cache 218 such as that illustrated in FIG. 3. Such a cache management module 400 may be hosted within the storage controller 200. The cache management module 400 may include various sub-modules to provide various features and functions. These modules may be implemented in hardware, software, firmware, or combinations thereof. The cache management module 400 and associated sub-modules are presented by way of example and not limitation. More or fewer sub-modules may be provided in different embodiments. For example, the functionality of some sub-modules may be combined into a single or smaller number of sub-modules, or the functionality of a single sub-module may be distributed across several sub-modules.

As shown, the cache management module 400 includes one or more of a statistics update module 402, initial staging module 404, read miss module 406, write module 408, demotion module 410, and scan and restage module 412. The statistics update module 402 may be configured to maintain the statistics 306 associated with the heterogeneous cache 218. For example, each time a data element (e.g., metadata track 302) is updated in the heterogeneous cache 218, the statistics update module 402 updates the write access count 308 and timestamp 310 associated with the data element. Similarly, when a data element is invalidated, the statistics update module 402 updates the validity information 312 associated with the data element.

The initial staging module 404 is configured to initially stage metadata tracks 302 into the lower performance portion 300b of the heterogeneous cache 218. This may, in certain embodiments, occur at IML time. In certain embodiments, all metadata tracks 302 that reside in backend storage drives 204 may be initially loaded into the lower performance portion 300b of the heterogeneous cache 218. Storing the metadata tracks 302 in the lower performance portion 300b may improve I/O performance to corresponding data tracks in the heterogeneous cache 218 and/or backend storage drives 204 since the metadata associated with the data tracks may be readily accessible in the lower performance portion 300b.

The read miss module 406 may perform various actions when a read miss occurs in the higher performance portion 300a of the heterogeneous cache 218. One embodiment of a method 500 that may be executed by the read miss module 406 will be discussed in association with FIG. 5. By contrast, the write module 408 may perform various actions when data elements are updated in the heterogeneous cache 218, and more particularly the higher performance portion 300a of the heterogeneous cache 218. One embodiment of a method 600 that may be executed by the write module 408 will be discussed in association with FIG. 6.

The demotion module 410 may perform actions associated with demoting (i.e., evicting) data elements from the higher performance portion 300a of the heterogeneous cache 218. Such demotions may occur to clear storage space in the higher performance portion 300a. One embodiment of a method 700 that may be executed by the demotion module 410 will be discussed in association with FIG. 7. Finally, the scan and restage module 412 may periodically scan the lower performance portion 300b of the heterogeneous cache 218 for metadata tracks 302 that have been invalidated and re-stage valid versions of these metadata tracks 302 into the lower performance portion 300b. One embodiment of a method 800 that may be executed by the scan and restage module 412 will be discussed in association with FIG. 8.

Figure 5:
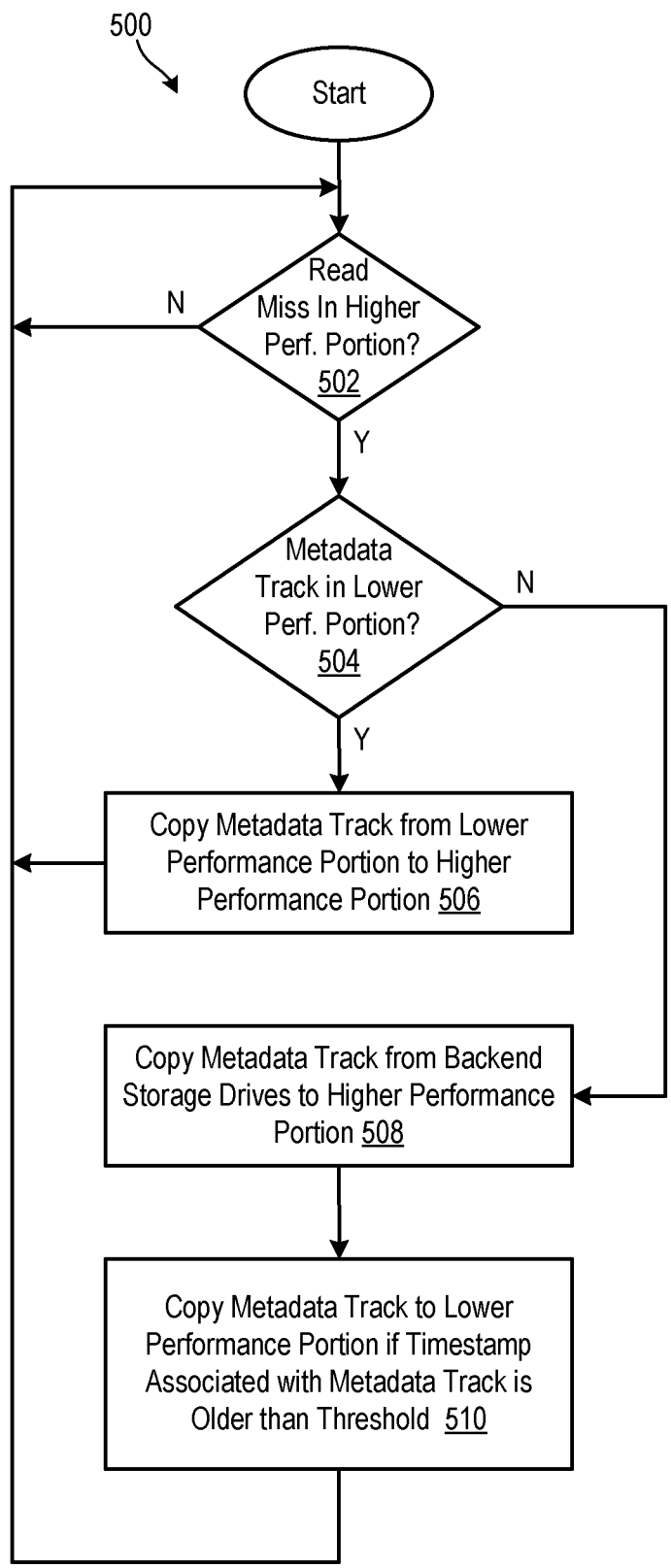
FIG. 5 is a flow diagram showing one embodiment of a method that may be executed in response to a read miss to a metadata track.

Referring to FIG. 5, one embodiment of a method 500 that may be executed in response to a read miss in the higher performance portion 300a of the heterogeneous cache 218 is illustrated. As shown, the method 500 determines 502 whether a read miss occurred in the higher performance portion 300a. That is, the method 500 determines 502 whether, in response to a read request directed to a metadata track 302, the metadata track 302 was not found in the higher performance portion 300a.

When such a read miss occurs, the method 500 determines 504 whether the requested metadata track 302 (i.e., a valid copy of the metadata track 302 as determined from the validity information 312b) is present in the lower performance portion 300b. If so, the method 500 copies 506 the metadata track 302 from the lower performance portion 300b to the higher performance portion 300a.

If, on the other hand, the requested metadata track 302 is not present in the lower performance portion 300b (i.e., a valid copy of the metadata track 302 is not stored in the lower performance portion 300b), the method 500 copies 508 the metadata track 302 from backend storage drives 204 to the higher performance portion 300a. The method 500 then copies 510 the metadata track 302 to the lower performance portion 300b if a timestamp associated with the metadata track 302 is older than a threshold. In essence, this step 510 copies the metadata track 302 to the lower performance portion 300b if the metadata track 302 has not been updated for a specified period of time. This prevents a potentially frequently updated metadata track 302 from being copied to the lower performance portion 300b and thereby placing excessive wear on the lower performance portion 300b.

Figure 6:
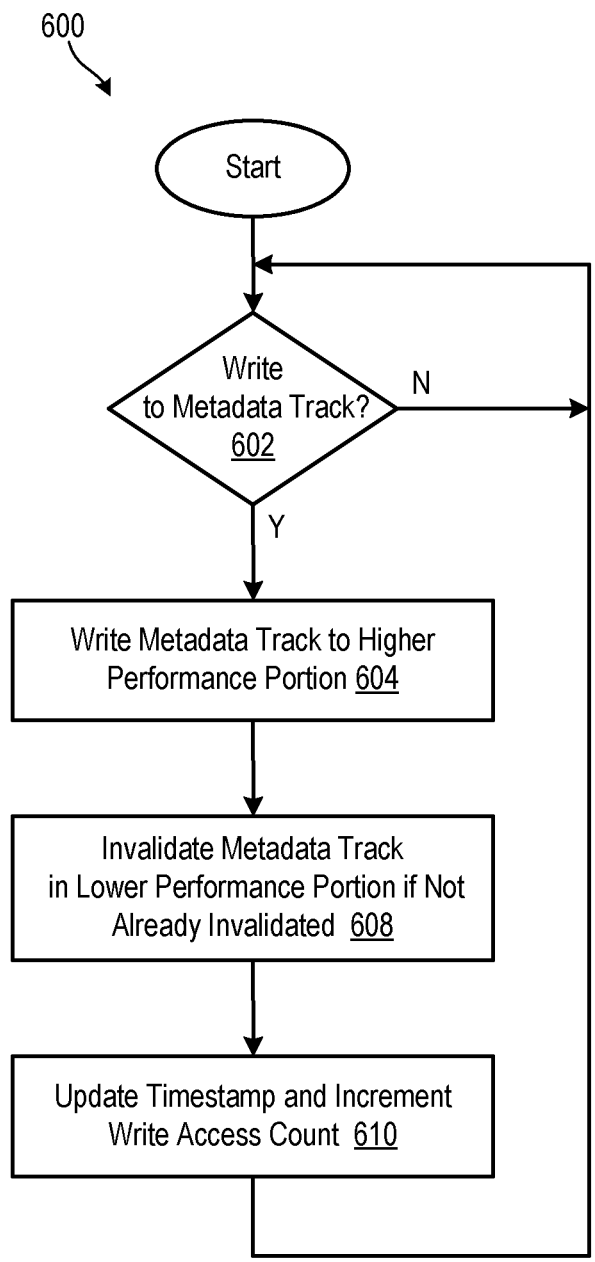
FIG. 6 is a flow diagram showing one embodiment of a method that may be executed in response to a write to a metadata track.

Referring to FIG. 6, one embodiment of a method 600 that may be executed in response to a write to a metadata track 302 in the heterogeneous cache 218 is illustrated. As shown, the method 600 determines 602 whether a write to a metadata track 302 is requested. If so, the method 600 writes 604 the updated metadata track 302 to the higher performance portion 300a of the heterogeneous cache 218.

When the metadata track 302 is written to the higher performance portion 300a, the method 600 invalidates 608 any copy of the metadata track 302 in the lower performance portion 300b if it has not already been invalidated. In other words, the method 600 updates the validity information 312b associated with the copy in the lower performance portion 300b to indicate that the metadata track 302 is no longer valid. The method 600 also updates 610 the timestamp 310a associated with the updated metadata track 302 in the higher performance portion 300a to indicate the day/time that the metadata track 302 was updated in the higher performance portion 300a, and increments 610 the write access count 308a associated with the updated metadata track 302.

Figure 7:
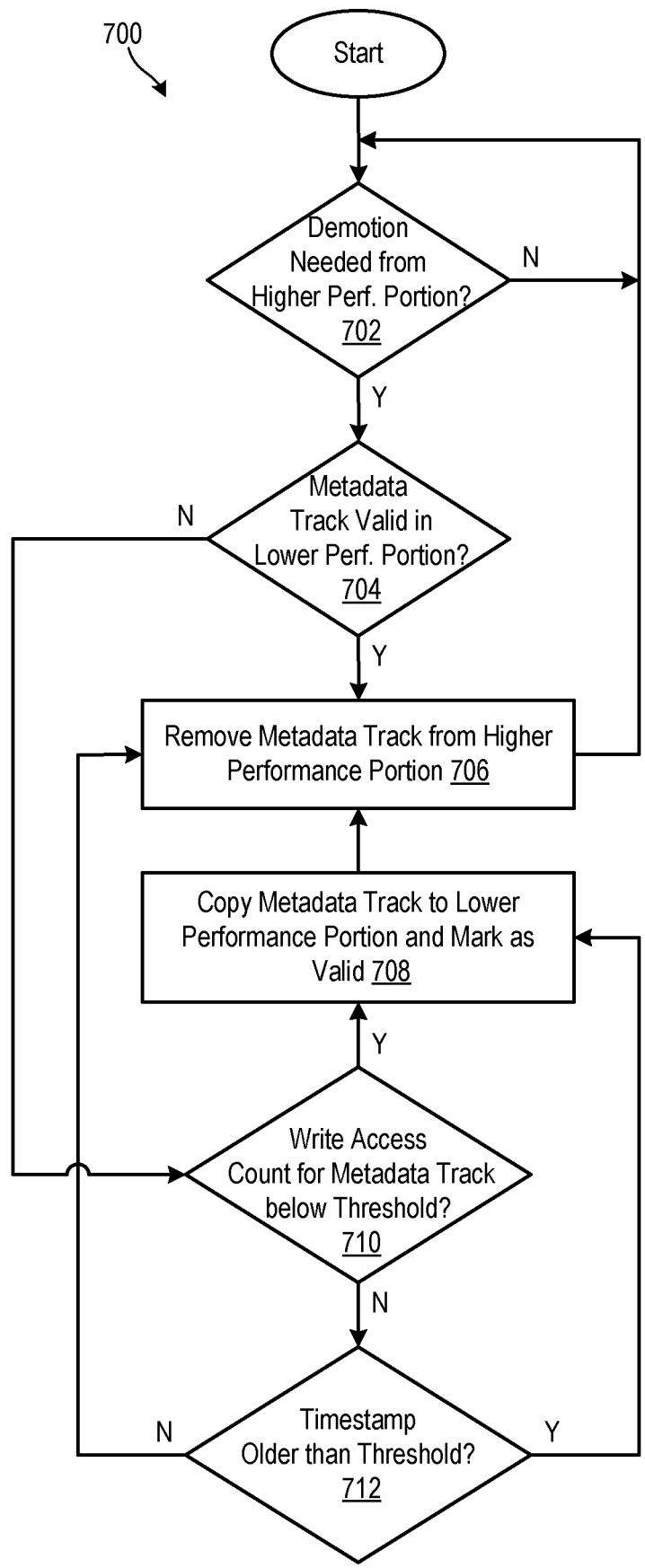
FIG. 7 is a flow diagram showing one embodiment of a method that may be executed when a metadata track is demoted from the higher performance portion.

Referring to FIG. 7, one embodiment of a method 700 that may be executed when a metadata track 302 is demoted (i.e., evicted) from the higher performance portion 300a is illustrated. Such a demotion may occur when space is needed in the higher performance portion 300a to accommodate additional data elements (e.g., tracks). As shown, the method 700 initially determines 702 whether a metadata track 302 needs to be demoted from the higher performance portion 300a. If so, the method 700 determines 704 whether a valid version of the metadata track 302 resides in the lower performance portion 300b. If so, the method 700 removes 706 the metadata track 302 from the higher performance portion 300a and the method 700 ends. Upon removing the metadata track 302 from the higher performance portion 300a, the method 700 may copy statistics 306 (i.e., the timestamp 310 and the write access count 308) to the copy of the metadata track 302 that resides in the lower performance portion 300b.

If, at step 704, the method 700 determines 704 that a valid copy of the metadata track 302 does not exist in the lower performance portion 300b, the method 700 determines 710 whether a write access count 308a associated with the metadata track 302 is below a threshold. In essence, this step 710 determines whether the metadata track 302 is infrequently updated. If the write access count 308a is below the threshold, the method 700 copies 708 the metadata track 302 from the higher performance portion 300a to the lower performance portion 300b and marks 708 the metadata track 302 as being valid. This may include copying the statistics 306 (i.e., the timestamp 310 and the write access count 308) to the copy of the metadata track 302 in the lower performance portion 300b. The method 700 then removes 706 the metadata track 302 from the higher performance portion 300a.

If, at step 710, the write access count 308a associated with the metadata track 302 is not below the threshold (meaning that the metadata track 302 is potentially frequently updated), the method 700 determines 712 whether the timestamp 310a associated with the metadata track 302 is older than a selected threshold. In essence, this step 712 determines whether the metadata track 302 has not been updated for a selected period of time. If so, the method 700 copies 708 the metadata track 302 to the lower performance portion 300b, marks 708 the metadata track 302 as valid, copies statistics 306 to the lower performance portion 300b, and removes 706 the metadata track 302 from the higher performance portion 300a. Otherwise, the method 700 simply removes 706 the metadata track 302 from the higher performance portion 300a (without copying the metadata track 302 to the lower performance portion 300b) and the method 700 ends.

Figure 8:
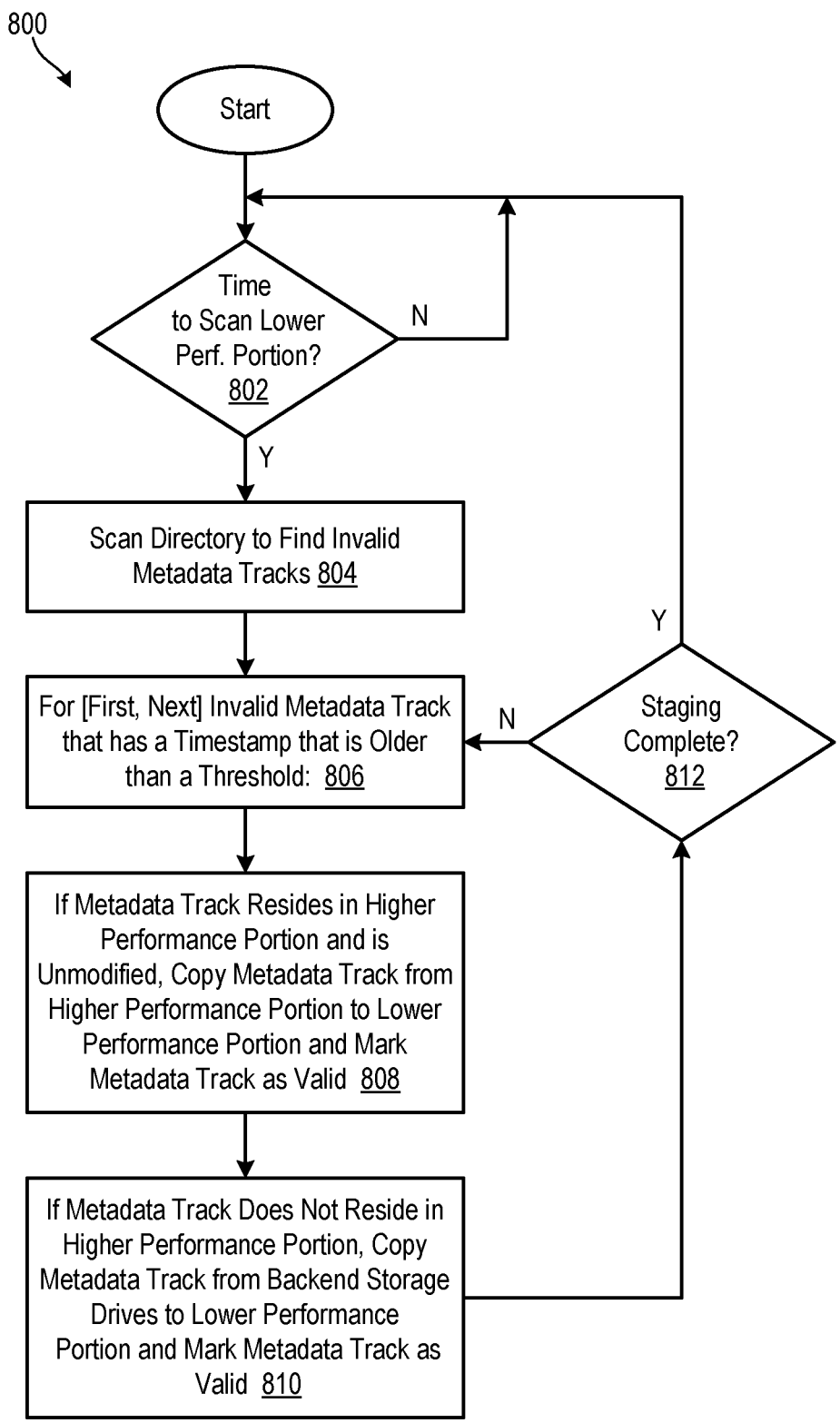
FIG. 8 is a flow diagram showing one embodiment of a method for periodically scanning and re-staging the lower performance portion with metadata tracks.

Referring to FIG. 8, a flow diagram showing one embodiment of a method 800 for periodically scanning and re-staging the lower performance portion 300b is illustrated. As shown, the method 800 determines 802 whether it is time to scan the lower performance portion 300b. In certain embodiments, scanning may occur every interval, such as every certain number of minutes or hours. If it is time to scan the lower performance portion 300b, the method 800 scans 804 the cache directory 304b of the lower performance portion 300b to find any metadata tracks 302 in the lower performance portion 300b that are marked as invalid.

For each invalid metadata track 302 in the lower performance portion 300b that has a timestamp 310b that is older than a threshold, the method 800 performs steps 808, 810. If, at step 808, the metadata track 302 resides in the higher performance portion 300a and is unmodified, the method 800 copies 808 the metadata track 302 from the higher performance portion 300a to the lower performance portion 300b and marks 808 the metadata track 302 as valid in the lower performance portion 300b. If, at step 810, the metadata track 302 does not reside in the higher performance portion 300a, the method 800 copies 810 the metadata track 302 from the backend storage drives 204 to the lower performance portion 300b and marks 810 the metadata track 302 as valid in the lower performance portion 300b. Once staging is complete at step 812, the method 800 ends.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other implementations may not require all of the disclosed steps to achieve the desired functionality. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The invention claimed is:

1. A method for storing metadata in a cache comprising heterogeneous memory types, the method comprising:
   staging, from backend storage drives, data elements containing metadata into a lower performance portion of a cache, the cache comprising the lower performance portion and a higher performance portion;
   in response to determining that the data elements are updated in the higher performance portion, recording when the data elements were updated and invalidating the data elements in the lower performance portion; and
   scanning the lower performance portion for the data elements that are invalidated and re-staging from the backend storage drives into the lower performance portion, the data elements that are invalidated and have not been updated in the higher performance portion in a last specified period of time.

2. The method of claim 1, wherein staging the data elements comprises staging the data elements at a time of an initial machine load (IML).

3. The method of claim 1, further comprising, in response to determining that the data elements are demoted from the higher performance portion, copying the data elements to the lower performance portion if write access counts for the data elements are less than a specified number.

4. The method of claim 1, wherein recording when the data elements were updated comprises recording timestamps indicating when the data elements were updated.

5. The method of claim 1, wherein the data elements are metadata tracks.

6. The method of claim 1, wherein the higher performance portion is made up of dynamic random access memory (DRAM) and the lower performance portion is made up of storage class memory (SCM).

7. The method of claim 1, wherein the lower performance portion has a larger storage capacity than the higher performance portion.

8. A system for storing metadata in a cache comprising heterogeneous memory types, the system comprising:
  at least one processor; and
  at least one memory device operably coupled to the at least one processor and storing instructions for execution on the at least one processor, the instructions causing the at least one processor to:
    stage, from backend storage drives, data elements containing metadata into a lower performance portion of a cache, the cache comprising the lower performance portion and a higher performance portion;
    in response to determining that the data elements are updated in the higher performance portion, record when the data elements were updated and invalidate the data elements in the lower performance portion; and
    scan the lower performance portion for the data elements that are invalidated and re-stage, from the backend storage drives into the lower performance portion, the data elements that are invalidated and have not been updated in the higher performance portion in a last specified period of time.

9. The system of claim 8, wherein staging the data elements comprises staging the data elements at a time of an initial machine load (IML).

10. The system of claim 8, wherein the instructions further cause the at least one processor to, in response to determining that the data elements are demoted from the higher performance portion, copy the data elements to the lower performance portion if write access counts for the data elements are less than a specified number.

11. The system of claim 8, wherein the data elements are metadata tracks.

12. The system of claim 8, wherein the higher performance portion is made up of dynamic random access memory (DRAM) and the lower performance portion is made up of storage class memory (SCM).

13. The system of claim 8, wherein the lower performance portion has a larger storage capacity than the higher performance portion.

14. A computer program product for storing metadata in a cache comprising heterogeneous memory types, the computer program product comprising a non-transitory computer-readable storage medium having computer-usable program code embodied therein, the computer-usable program code configured to perform the following when executed by at least one processor:
  stage, from backend storage drives, data elements containing metadata into a lower performance portion of a cache, the cache comprising the lower performance portion and a higher performance portion;
  in response to determining that the data elements are updated in the higher performance portion, record when the data elements were updated and invalidate the data elements in the lower performance portion; and
  scan the lower performance portion for the data elements that are invalidated and re-stage, from the backend storage drives into the lower performance portion, the data elements that are invalidated and have not been updated in the higher performance portion in a last specified period of time.

15. The computer program product of claim 14, wherein staging the data elements comprises staging the data elements at a time of an initial machine load (IML).

16. The computer program product of claim 14, wherein the computer-usable program code is further configured to, in response to determining that the data elements are demoted from the higher performance portion, copy the data elements to the lower performance portion if write access counts for the data elements are less than a specified number.

17. The computer program product of claim 14, wherein recording when the data elements were updated comprises recording timestamps indicating when the data elements were updated.

18. The computer program product of claim 14, wherein the data elements are metadata tracks.

19. The computer program product of claim 14, wherein the higher performance portion is made up of dynamic random access memory (DRAM) and the lower performance portion is made up of storage class memory (SCM).

20. The computer program product of claim 14, wherein the lower performance portion has a larger storage capacity than the higher performance portion.

* * * * *